United States Patent [19]

Uraneck et al.

[11] 4,013,824

[45] * Mar. 22, 1977

[54] MIXING OF ORGANOSULFUR MOLECULAR WEIGHT MODIFIER WITH EMULSIFIER IN PRESENCE OF MONOMER OR DILUENT

[75] Inventors: Carl A. Uraneck; John E. Burleigh, both of Bartlesville, Okla.

[73] Assignee: Phillips Petroleum Company, Bartlesville, Okla.

[ * ] Notice: The portion of the term of this patent subsequent to Dec. 17, 1991, has been disclaimed.

[22] Filed: Nov. 18, 1974

[21] Appl. No.: 524,828

Related U.S. Application Data

[63] Continuation of Ser. No. 360,960, May 16, 1973, abandoned.

[52] U.S. Cl. .................................. 526/205; 526/80; 526/81; 526/93; 526/207; 526/220; 526/223; 526/224; 526/225; 526/340
[51] Int. Cl.$^2$ .................... C08F 1/09; C08F 1/36; C08F 3/02
[58] Field of Search ............... 260/84.3, 82.7, 85.3, 260/94.4, 83.5; 526/205, 207, 220, 223, 224, 225, 340

[56] References Cited

UNITED STATES PATENTS

| | | | |
|---|---|---|---|
| 2,715,115 | 8/1955 | Blanchette | 260/84.3 |
| 2,720,510 | 10/1955 | Rothlisberger | 260/83.5 |
| 3,510,467 | 5/1970 | Azoulay | 260/94.4 |
| 3,855,188 | 12/1974 | Uraneck | 260/84.3 |

*Primary Examiner*—Christopher A. Henderson

[57] ABSTRACT

Initial depletion of organosulfur molecular weight regulator during initial polymerization conversion in emulsion polymerization systems employing coagitated mixtures of emulsifiers and organosulfur molecular weight regulators is reduced by coagitating in the presence of an additive which is monomer-soluble diluent a portion of polymerizable monomer prior to use of the coagitated admixture in the emulsion polymerization systems.

12 Claims, No Drawings

MIXING OF ORGANOSULFUR MOLECULAR WEIGHT MODIFIER WITH EMULSIFIER IN PRESENCE OF MONOMER OR DILUENT

This application is a continuation of Ser. No. 360,960, filed May 16, 1973, now abandoned.

FIELD OF THE INVENTION

The invention relates to emulsion polymerization systems employing organosulfur compounds as molecular weight modifiers or regulators.

BACKGROUND OF THE INVENTION

Organosulfur molecular weight modifiers or regulators in emulsion polymerization systems have exhibited somewhat variable efficiencies. Higher molecular weight species, particularly the mercaptan compounds, possess relatively low chain transfer effectiveness. Lower molecular weight species have higher volatilities which may contribute to residual odors in the polymeric product. Further, relatively high loss or depletion of the organosulfur molecular weight modifier has been observed in the first stages of monomer conversion, particularly about the first 10 percent conversion of monomer, in the emulsion polymerization process. Such high loss or depletion reduces effectiveness of the organosulfur molecular weight modifier, requiring use of increased amounts, thus increasing the cost of the polymer, as well as resulting in variations in product quality. It is certainly preferable for both economy and product quality with minimum residual odor to use minimum amounts of modifier consistent with effectiveness.

OBJECTS OF THE INVENTION

It is an object of the invention to improve the effectiveness of organosulfur compounds in emulsion polymerization systems.

Other aspects, objects, and advantages of the invention will be apparent from a study of this disclosure including the appended claims.

BRIEF SUMMARY OF THE INVENTION

We have discovered that coagitation of the organosulfur compound, the emulsifier, and an additive which is a monomer-soluble hydrocarbon diluent or a polymerizable monomer, preferably at least a portion of the polymerizable monomer prior to addition to the emulsion polymerization system, improves markedly the reactivity of the organosulfur compound and yet avoids or greatly reduces the untoward loss of or depletion of organosulfur modifier otherwise experienced during the first steps of conversion of polymerizable monomer when utilizing coagitated emulsifier solution/organosulfur compound mixtures in the emulsion polymerization process.

DETAILED DESCRIPTION OF THE INVENTION

Our invention applies to emulsion polymerization processes employing organosulfur compounds as chain transfer agents or molecular weight modifiers or regulators.

In the process of our invention, the emulsifier, the organosulfur compound, and an additive which is an inert hydrocarbon diluent or polymerizable monomer, preferably at least a portion of the polymerizable monomer to be polymerized, are admixed and coagitated together prior to introduction of these components into the balance of the emulsion polymerization mixture. This coagitation markedly increases the reactivity of the organosulfur compounds as modifiers. Importantly, the further inclusion of the defined additive in the coagitation admixture process not only maintains the reactivity of the organosulfur compound, but acts to substantially reduce or eliminate the otherwise undesirable and untoward loss or depletion organosulfur modifier during the first stages of polymerization.

MODIFIERS

Our invention is applicable to any organosulfur molecular weight modifier or regulator employed in an emulsion polymerization system. Suitable types of organosulfur modifiers include the presently preferred mercaptans, as well as such as dialkyl dixanthogens, diaryl disulfides, tetraalkylthiuram mono- and disulfides, mercaptothiazoles, and the like, alone or in admixture.

Most used commercially at present are the mercaptan compounds, and of these presently are preferred the hydrocarbyl mercaptans containing 8 to 20 carbon atoms per molecule, including straight or branched chain alkyl, alkenyl, alkadienyl, as well as cycloalkyl, cycloalkenyl, cycloalkadienyl, aryl, and combinations such as alkaryl and aralkyl, and the like. The presently more preferred mercaptan modifiers are those of tertiary alkyl configuration.

The amount of organosulfur modifier employed can vary widely depending on the particular compound or mixture chosen, the polymerization temperatures, the emulsifier and other recipe ingredients, and the extent of results or modification desired. Coagitation permits use of higher molecular weight organosulfur compounds that might otherwise be employed since coagitation of the modifier with the emulsifier raises the regulating index values of the modifier. Satisfactory modification can be obtained by employing on the order of 0.01 to 5 phm parts organosulfur compound per 100 parts monomer by weight, with 0.05 to 2 phm presently being preferred, though greater or lesser amounts may be utilized where desired.

Suitable organosulfur compounds include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthalenethiol, and the like; bis(tetrahydrofurfural xanthogen), diphenyl disulfide, tetramethylthiuram disulfide, 2-mercaptobenzothiazole, and the like. Mixtures or blends of any of these organosulfur compounds can also be used. Commercially available and suitable organosulfur compound modifiers often are mixtures of organosulfur compounds, e.g., mixtures of t-dodecyl, t-tetradecyl, and t-hexadecyl mercaptans.

EMULSIFYING AGENTS

A wide variety of emulsifying agents can be employed, including rosin acid soaps, disproportionated rosin acid soaps, fatty acid soaps, mixtures of disproportionated rosin acid soaps with fatty acid soaps, alkaryl sulfonates, and other surface-active materials and mixtures thereof. Nonionic emulsifiers also can be employed, including polyethers and polyols.

Amounts of emulsifying agent employed depend on the agent type as well as on reaction parameters and the polymerizable monomer concentrations to be maintained in the emulsion polymerization system. An expedient range would be about 0.5 part to 10 phm, parts by weight per 100 parts of polymerizable monomer. The relative amounts of emulsifier:modifier can range widely depending on monomers, species, reaction parameters, degree of modification desired, and the like. An exemplary amount includes a range of about 250-1 to 1:1 weight ratio of emulsifier:modifier, though operability outside of this range is feasible.

Aqueous medium normally is employed with the emulsifier, though other components such as one or more of the lower alcohols or glycols may be added for lower temperature polymerizations when desired. The amount of water or water and alcohol or glycol employed is a matter of convenience as to amounts of materials to handle and is not limiting so far as making the agitated admixture of emulsifier:modifier is concerned. Supplemental water for the emulsion polymerization process itself can be readily later added at that stage.

ADDITIVE TO COAGITATION STEP

The third component, the additive, which we employ in our coagitation mixture is an inert hydrocarbon diluent or polymerizable monomer. The polymerizable monomer can be and preferably is the same polymerizable monomer as will be polymerized in the emulsion polymerization process. Alternative to the use of all or of a portion of the polymerizable monomer is the employment of a reaction inert hydrocarbon diluent.

Thus, any of the monomers can be employed which are described hereinbelow as emulsion polymerizable monomers. Presently preferred are the polymerizable conjugated dienes, or monovinyl-substituted aromatic compounds, and of these, butadiene or styrene. In practice we employ the monomer or one of the two comonomers which are to be polymerized, otherwise the ultimate product could represent a less desirable terpolymer. In practice styrene is handier to use than butadiene in situations of preparation of butadiene/styrene copolymers.

Examples of suitable oil-soluble diluents include aliphatic, cycloaliphatic, and aromatic hydrocarbons such as n-heptane, isooctane, cyclohexane, ethylcyclohexane, toluene, ethylbenzene, cumene, p-cymene, decalin, naphthalene, p-terphenyl, and the like, either alone, or in admixture, as well as others unreactive in the polymerization reaction, preferably, though not necessarily limited, to those of 6 to 14 carbon atoms per molecule.

The particular additive, hydrocarbon diluent, or polymerizable monomer and the optimum quantities of the additive or mixture thereof, and the composition of the mixture where used, are readily determinable for a given set of coagitation and polymerization conditions. Desired amounts for incorporation into the coagitation admixture of organosulfur compound/emulsifier will vary depending primarily on the choice of emulsifier and organosulfur compound. All of the monomer to be polymerized can be incorporated into the coagitation step, if desired, or only a portion can be used, if preferred. Thus, the amount of additive, monomer, or diluent employed in the coagitation need only be an amount sufficient to provide the results desired, i.e., substantially avoid premature loss of mercaptan. We suggest the employment of 1 to 100 phm of the monomer, or of 0.1 to 50 phm of the diluent, or of 0.1 to 50 phm of both together. We presently prefer 5 to 50 phm when employing a monovinyl aromatic compound as the additive, or 50 to 100 phm when employing a conjugated diene, or 1 to 10 phm of diluent, or 1 to 10 phm when diluent and monomer are used together.

In conducting coagitation in the presence of the additive in accordance with our invention, the emulsifier, the water, the organosulfur modifier, and the additive to the extent employed, must all be present together during at least a portion of the coagitation step. Optionally, the remaining components of the emulsifier solution, typically as shown in the polymerization recipes of our Examples, or some of the remaining components, or none of them, can be present during coagitation. Further options initially withholding the monomer and/or diluent from the coagitation process and then adding the monomer and/or diluent to the other coagitation components for resumed coagitation as contrasted to simply coagitating the entire emulsifier-water-modifier-additive combination as such.

Coagitation as described is to be distinguished from the ordinary preemulsification step as the polymerization mixture is tumbled or otherwise agitated when being brought up to the desired polymerization temperatures. Coagitation takes place prior to be preemulsification step.

The coagitation employed refers to the strong and thorough mixing of the organosulfur compound modifier or regulator with at least a portion of the emulsifier, preferably as an aqueous emulsifier, i.e., emulsifier-water solution, and the monomer or diluent, in such manner as to afford significant reduction in the particle size of the organosulfur compound. The amount or degree of mixing is that sufficient to effectuate the extent of improvement in regulating index desired.

Coagitation, which can be accomplished by a variety of means, markedly increases the reactivity of the organosulfur compounds as modifiers. Moreover, the effect of coagitation has been found to be advantageous in many cases, i.e., where the regulating index as defined below has a value less than about 4 under conditions of a standard commercial polymerization rate for SBR-type systems, Uraneck, C. A. and Burleigh, J. E. 19 Kautschuk und Gummi Kunststoffe, 532–542 (1961).

Additionally, and desirably, at constant rate of shear in the coagitation of the admixture of modifier and emulsifier, lengthening of the coagitation time interval also increases the intensity of the effect. Alternatively, maintaining constant mixing time and increasing the rate of shear also produces this effect.

The increased activity of the organosulfur modifier makes it possible to use reduced amounts of such regulating compound in a given system than otherwise would be required, providing that the regulating index is less than optimum, e.g., less than about 4 in SBR-type systems (see Uraneck and Burleigh, vide supra). The increased reactivity obtained according to the method of our invention also makes practical the employment in emulsion polymerization systems of organosulfur compounds of higher molecular weight than otherwise practical, thus reducing or minimizing the hazard of residual organosulfur compound odor in the ultimate product. Of course, coagitation should not be employed to the extent of exceeding the optimum regulating index value excessively, because, to the degree that such might occur, it would negate the value of the coagitation. In some instances, where incremental addition of modifier is practiced, the portioning of the emulsified modifier should be matched to the regulating index as discussed by Uraneck, C. A. and Burleigh, J. E., "Modification of Emulsion Polymerization by Multiple Addition of Modifiers," 15 J. Polymer Science, 1757 (1971).

The increase in reactivity of a modifier can be interpreted quantitatively as an increase in the regulating index as measured by the rate of depletion of the modifier. Specifically, the regulating index, $r$, is defined as $$r = -d(\ln S)/dX$$

wherein S represents the concentration of organosulfur compound and X the fractional conversion. Coagitation of the mixture of modifier and emulsifier affords a range of $r$ values within limits based on the reactivity of the organosulfur compound and the intensity and duration of agitation.

Consistent with the above equation, a normal rate of mercaptan depletion would be represented by a straight line, or nearly so, when r is plotted as the log of residual mercaptan versus the conversion of monomer. However, it has been found in practice with coagitated emulsifier solution-mercaptan systems, that the depletion rate for the mercaptan modifier tends to be abnormally high during the first approximate 10 percent of the reaction period. This abnormally high rate of mercaptan depletion, presumably through side reactions, subtracts from the quantity of mercaptan available for polymer modification. This effect tends to be an uncontrolled variable and smooth, efficient proper operation of an emulsion polymerization system requires that this tendency toward abnormal depletion be reduced or effectively eliminated.

Coagitation of emulsifier, modifier and the polymerizable monomer or hydrocarbon diluent to the extent employed may be accomplished by any suitable means including tumbling action, stirring, shearing action, application of high frequency vibrations, or the like. Various mills, in which the walls of the vessel, blades, or vanes of a stirrer, and the like, can be utilized to provide the necessary shearing action and/or coagitation. Waring Blendor mixers are effective. Another suitable device is an ultrasonic bath such as a Model G140-25 made by the National Ultrasonic Corporation which imparts a work force of ultrasonic energy upon the components to be admixed according to the process of our invention. Coagitation should be performed under an inert atmosphere, such as nitrogen, helium and the like, to avoid loss of organosulfur compound.

In the coagitation process, the time employed may depend upon the particular method or milling device chosen, but should at least be sufficient to provide the desired increase in modifier activity. The optimum time interval for a desired degree of agitation depends on the efficiency of the equipment used and the particular components and modifiers employed. The frequency and force of collision and the wave frequency, intensity, and absorbing capacity of the ultrasonic milled components all may vary with the time employed. More vigorous operations require reduced time, e.g., effective agitation can occur with tumbling in about 70 to 100 hours, with ultrasonic vibration in 1 to 2 hours, and with high speed shearing action in less than one hour.

EMULSION POLYMERIZATION INITIATORS

Free-radical initiators useful in the emulsion polymerization process include any of the broad groups of compounds utilized for the purpose of emulsion polymerization systems, including redox initiator systems such as ferrous sulfate/hydrogen peroxide, potassium persulfate/sodium bisulfite, and the like, and more particularly the free-radical initiators classed as the monomer-soluble organoperoxides, organohydroperoxides, and azo compounds. Amounts expediently employed are of the order of about 0.01 to 5 phm, more preferred about 0.03 to 1 phm.

Exemplary catalysts include di-t-butylperoxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azobis(2-methylpropionitrile), and the like, and mixtures thereof.

MONOMERS

Monomers employed in a process incorporating our invention include any monomers polymerizable with a redox system or with free-radical polymerization initiators in emulsion polymerization processes, such as polymerizable conjugated dienes, alone or with monovinyl aromatic compounds, or with ethylenically unsaturated polymerizable monomers. Polymerizable conjugated dienes commonly employed include those containing 4 to 12, preferably for commerical availability 4 to 8, carbon atoms per molecule, such as 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include copolymers formed by polymerizing one or more polymerizable conjugated dienes with one or more copolymerizable monomers. These include such as monovinyl-substituted or monopropenyl-substituted aromatic compounds, such as those of 8 to 20, more particularly for commerical availability 8 to 12, carbon atoms per molecule, include styrene, various of the alkylstyrenes such as p-methylstyrene, 1-propenylbenzene or beta-methylstyrene, halostyrenes such as 2,3-dichlorostyrene; as well as other copolymerizable ethylenically unsaturated monomers including the polymerizable nitriles such as acrylonitrile or methacrylonitrile, esters of acrylic and methacrylic acid, e.g., ethyl acrylate and methyl methacrylate, vinyl esters such as vinyl acetate, other vinyl compounds such as vinyl halides exemplified by vinyl chloride; and the like.

The process also is useful in the preparation of SAN type resins, i.e., copolymers of styrene or substituted styrenes with the vinyl nitriles. Substituted styrenes include these those of 8 to 20 carbon atoms per molecule such as alpha-methylstyrene, ortho-, meta-, or p-alkyl aromatic substituted styrenes; o-, m-, or p-halogenated styrenes wherein the halogen can be any of fluorine, chlorine, bromine, or iodine; and the vinyl nitriles include those of 3 to 12 carbon atoms per molecule such as acrylonitrile, methacrylonitrile, and the like, all as prepared in emulsion systems modified with organosulfur molecular weight modifiers. The coagitated modifiers are useful in preparing copolymers of styrene and acrylate including any of the esters of acrylic and methacrylic acid such as methyl, ethyl, butyl, acrylates and methacrylates. Latexes of these latter copolymers are particularly suitable for latex base paints.

A further class of polymers which can benefit from the process of our invention of employing coagitated modifiers are ABS compositions made by the emulsion process. In the ABS process, an emulsion or latex of an unsaturated elastomer is first prepared, such as by dissolving the elastomer in polymerizable monomers and emulsifying the resulting solution, and the polymerizable momoner or various combinations of monomers such as the styrenes, vinylnitriles, acrylates, then are co- or terpolymerized in the presence of the elastomeric dispersion.

POLYMERIZATION CONDITIONS

Polymerization conditions of temperature, time, pressure, and the like can range widely, depending upon particular materials and reactor conditions desired or convenient to employ, the monomers involved, relative volatility thereof, amounts of water, and equipment involved.

Polymerization commonly is carried out by continuously agitating the polymerization emulsion under an inert atmosphere, e.g., nitrogen, at polymerization temperatures expediently in the range of about −40° to +100° C., preferably about 0° to 50° C. The pH range can vary widely such as about 1 to 12, and presently preferably about 7 to 10.8.

After the degree or extent of polymerization desired has been accomplished, the polymerization reaction can be terminated with a shortstop. An antioxidant also usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The product then is collected by filtration, washed, dried in conventional drying equipment.

EXAMPLES

The following examples are intended to further illustrate our invention. In these runs both the coagitation and the polymerization steps are carried out under an inert atmosphere, e.g., nitrogen. Particular species employed, particular conditions, particular amounts used in the examples, are intended to be illustrative and not limitative of the reasonable and proper scope of our invention.

EXAMPLE I

Run 1 is a control run in that no additive, neither monomer nor diluent, was present during the coagitation. In making up the mixture for coagitation, the components of the Emulsifier Solution were combined with the water at a boil with said boiling being briefly continued to exclude dissolved air. After cooling, the mercaptan was added and the resulting combination was coagitated under nitrogen in a Waring Blendor Model EP-1 for 40 minutes at 85° F. initial temperature to 195° F. final temperature. The polymerization was carried out under a nitrogen atmosphere. The run was made in accordance with the following recipe.

| Run 1 Recipe: SBR 1500 | |
|---|---|
| | Parts by Weight |
| Emulsifier Solution | |
| Potassium salt of a disproportionated rosin acid | 4.6 |
| KOH | 0.16 |
| KCl | 0.3 |
| Sodium alkylnaphthalene sulfonate | 0.2 |
| $Na_2S_2O_4$ | 0.1 |
| Tetrahydrate of the sodium salt of ethylenediamine tetraacetic acid | 0.02 |
| Water | 170 |
| Modifier | |
| t-Hexadecyl mercaptan | 0.45 |
| Monomers | |
| Butadiene | 70 |
| Styrene | 30 |
| Oxidant | |
| p-Menthane hydroperoxide | 0.063 |
| Activator Solution | |
| Tetrahydrate of the sodium salt of ethylenediamine tetraacetic acid | 0.036 |
| $FeSO_4 \cdot 7H_2O$ | 0.01 |
| $NaO_2SCH_2OH \cdot 2H_2O$ | 0.05 |
| Water | 10 |
| Polymerization temperature, ° C. | 5 |

The polymerization recipe ingredient charge order to the reactor was (1) coagitated mixture, (2) monomers, (3) oxidant, (4) activator solution.

Run 2 is a run of the invention illustrating the effect under SBR 1500 conditions of the presence of a portion of the polymerizable monomer during a portion of the coagitation step.

Specifically, after the 40-minute coagitation period carried out as described in Run 1, the mixture was cooled to room temperature and the 30 phm of monomer were added. This resulting combination was coagitated for 5 minutes under nitrogen reaching a final temperature of 130° F. The coagitated mixture then was promptly cooled to room temperature and employed in the polymerization step. Otherwise, the recipe and procedure of Run 1 was followed.

The data obtained in control Run 1 and inventive Run 2 are shown in Table I.

Table I

| | | SBR 1500 Systems | | | | |
|---|---|---|---|---|---|---|
| Run | | 1 | | | 2 | |
| Additive | | none | | | styrene | |
| Amount, phm | | 0 | | | 30 | |
| a. Preemulsification[1] | Hour | Conversion[2] | RSH. Wt. %[3] | Hour | Conversion[2] | RSH, Wt. %[3] |
| | 0.0 | 0 | 96 | 0 | 0 | 93.3 |
| | 0.25 | 0 | 92.5 | 0.25 | 0 | 90.3 |
| | 0.4 | 0 | 94.4[4] | 0.4 | 0 | 91.1[4] |
| b. Polymerization | 0.1 | 1 | 84.3 | 0.1 | 0.5 | 89.2 |
| | 0.3 | 3 | 77.2 | 0.3 | 2 | 85.6 |
| | 1.6 | 15 | 52.8 | 1.7 | 13 | 64.8 |
| | 3.0 | 29 | 36.9 | 3.1 | 27 | 42.8 |

Table I-continued

| | | SBR 1500 Systems | | | |
|---|---|---|---|---|---|
| 4.6 | 45 | 27.8 | 4.7 | 42 | 25.8 |

(1)Preemulsification, the mixing of ingredients in the reactor prior to initiation.
(2)Percentage conversion values were obtained by determining, through volatilizations, the increase in weight over the amount accounted for by the nonpolymeric solids present such as emulsifier, salts and the like.
(3)The weight percent of the mercaptan originally charged to the soap solution for coagitation that remains unreacted. Analytical determinations were made by the method of Kolthoff, I. M. and Harris, W. E. 2 J. Poly. Sci., 49 (1947).
(4)Anomalous, out of order, values reflect the difficulty in obtaining satisfactory analytical samples from a heterogeneous system.

Run 3

Run 3 is an SBR 1503 control run in which neither monomer nor diluent was present during the coagitation step. In making up the mixture for coagitation, the sodium dithionite $Na_2S_2O_4$ was added in solid form to a boiling aqueous solution of the fatty acid potassium salt. The resulting solution, under nitrogen atmosphere, was cooled to room temperature and the mercaptan added. The resulting mixture was coagitated under a nitrogen atmosphere in a Waring Blender for 40 minutes at 75° F. initial temperature to 205° F. final temperature. The polymerization step was carried out under a nitrogen atmosphere following the procedure of Run 1. The run was made in accordance with the following recipe:

Run 3 Recipe: SBR 1503

| | Parts by Weight |
|---|---|
| Emulsifier Solution | |
| Potassium fatty acid soap | 4.6 |
| $Na_2S_2O_4$ | 0.106 |
| KOH | 0.03 |
| KCl | 0.3 |
| Sodium alkylnaphthalene sulfonate | 0.2 |
| Water | 170 |
| Modifier | |
| t-Hexadecyl mercaptan | 0.556 |
| Monomers | |
| Butadiene | 70 |
| Styrene | 30 |
| Oxidant | |
| p-Menthane hydroperoxide | 0.063 |
| Activator Solution | |
| Tetrahydrate of the sodium salt of ethylenediamine tetraacetic acid | 0.032 |
| $FeSO_4 . 7H_2O$ | 0.01 |
| $NaO_2SCH_2OH . 2H_2O$ | 0.05 |
| Water | 10 |
| Polymerization temperature, ° C. | 5 |

Run 4

Run 4 is an inventive run and illustrates the effect under SBR 1503 conditions of the presence of a small amount of the polymerizable monomer according to our invention during a portion of the coagitation step. Styrene at 5 phm was employed, and this 5 phm styrene is 5 of the 30 phm shown in the recipe. Specifically, after 40 minutes of coagitation under nitrogen at 75° to 210° F. of a mixture prepared as described in Run 1, the mixture was cooled to room temperature and 5 phm styrene added. This resulting combination was coagitatedzin a Waring Blender for 5 minutes under nitrogen, reaching a final temperature of 110° F. The mixture then was promptly cooled to room temperature and employed in the polymerization using the Run 4 recipe shown below and otherwise following the general procedure of Run 1.

Run 4 Recipe: SBR 1503

With the exceptions noted below, the recipe of Run 3 was followed:

| | Parts by Weight |
|---|---|
| Component | |
| In the Emulsifier Solution | |
| KCl | 0.2 |
| Sodium alkylnaphthalene sulfonate | 0.3 |
| $Na_2S_2O_4$ | 0.1 |
| Tetrahydrate of the sodium salt of ethylenediamine tetraacetic acid | 0.02 |
| Modifier | |
| t-Hexadecyl mercaptan | 0.403 |

Run 5

Run 5 illustrates the effect under SBR 1503 conditions of the presence of all 30 phm monomer styrene during a portion of the coagitation step. Specifically, after 40 minutes of coagitation under nitrogen at 75° to 205° F. of a mixture prepared as described in Run 1, the mixture was cooled to room temperature and the styrene was added. This resulting combination was coagitated for 5 minutes under nitrogen reaching a final temperature of 95° C. The coagitated mixture then was promptly cooled to room temperature and employed in polymerization in accordance with the Run 5 recipe shown below, otherwise following the general procedure of Run 1.

Run 5 Recipe: SBR 1503

With the exceptions noted below, the recipe of Run 3 was followed.

| | Parts by Weight |
|---|---|
| Component | |
| In the Emulsifier Solution | |
| $Na_2S_2O_4$ | 0.1 |
| Tetrahydrate of the sodium salt of ethylenediamine tetraacetic acid | 0.02 |
| Modifier | |
| t-Hexadecyl mercaptan | 0.45 |

Run 6 illustrates the effect under SBR 1503 conditions of the presence of 5 phm hydrocarbon diluent consisting of mixed isomers of xylene during the second portion of the coagitation step basically as per Run 2, and Runs 4 and 5. Specifically, after 40 minutes of coagitation under nitrogen at 75° to 200° F. of a mixture comprising the Emulsifier Solution plus the mercaptan, the mixture was cooled to room temperature and the xylene added. This resulting combination was coagitated in a Waring Blendor for 5 minutes under nitrogen reaching a final temperature of 100° F. The coagitated mixture then was cooled to room temperature and employed in polymerization in accordance with the Run 6 recipe shown below, otherwise following the general procedure of Run 1.

Run 6 Recipe: SBR 1503

With the exceptions noted below, the recipe of Run 3 was followed.

| Component | Parts by Weight |
|---|---|
| In the Emulsifier Solution | |
| Tetrahydrate of the sodium salt of ethylenediamine tetraacetic acid | 0.02 |
| $Na_2S_2O_4$ | none |
| Modifier | |
| t-Hexadecyl mercaptan | 0.426 |
| Diluent | |
| Xylene (mixed isomers) | 5 |

Table II

| | SBR 1503 Systems | | | | | | | | | | | |
|---|---|---|---|---|---|---|---|---|---|---|---|---|
| Runs | 3 | | | 4 | | | 5 | | | 6 | | |
| Additive | none | | | styrene | | | styrene | | | xylene | | |
| Amount, phm | 0 | | | 5 | | | 30 | | | 5 | | |
| a. Preemulsification | Hour | Conversion | RSH Wt.% | Hour | Conversion[2] | RSH Wt.% | Hour | Conversion[2] | RSH Wt.% | Hour | Conversion[2] | RSH Wt.% |
| | 0 | 0 | 96 | 0 | 0 | 93.2 | 0 | 0 | 96.2 | 0 | 0 | 100 |
| | 0.25 | 0 | 91 | 0.25 | 0 | 90.2 | 0.25 | 0 | 93.6 | 0.25 | 0 | 97.6 |
| | 0.4 | 0 | 98[1] | 0.4 | 0 | 91.2[1] | 0.4 | 0 | 94.6[1] | 0.40 | 0 | 97.8[1] |
| b. Polymerization | 0.1 | 1.5 | 45 | 0.1 | 1.5 | 86.7 | 0.1 | 1.5 | 90.3 | 0.1 | 2 | 92.3 |
| | 0.3 | 5 | 35 | 0.3 | 4 | 66.7 | 0.3 | 4 | 79.3 | 0.25 | 4 | 85.1 |
| | 1.8 | 27 | 25 | 0.9 | 12 | 37.3 | 1.7 | 22 | 35.6 | 1.6 | 22 | 52.6 |
| | 2.8 | 41 | 22 | 2.25 | 28 | 21.3 | 2.5 | 32 | 23.8 | 2.5 | 35 | 39.7 |
| | 3.7 | 51.5 | 19 | 3.25 | 39 | 15.2 | 3.6 | 44 | 15.0 | 3.5 | 48 | 29.6 |
| | — | — | — | 4.2 | 50 | 11.5 | 4.1 | 50 | 10.4 | — | — | — |

[1]Anomalous values reflect the difficulties in obtaining satisfactory samples from the heterogeneous system.
[2]Weight percent of mercaptan remaining unreacted having been normalized to exclude loss during coagitation.

It is evident from inspection of the data in Tables I and II that the presence of an additive according to our invention, either part or all of a monomer or diluent, markedly reduces or eliminates the abnormal loss of mercaptan modifier during the early stages of polymerization. Specifically, comparing control Run 1 with inventive Run 2 in Table I, and control Run 3 with inventive Run 5 in Table II, it is readily observed that 30 phm styrene definitely reduces the otherwise severe depletion of modifier.

In contrasting control Run 1 of Table I with control Run 3 of Table II, it is observed is even more severe with the SBR 1503 system than with the SBR 1500 system.

Comparing control Run 3 with inventive Run 4, clear improvement is shown even at the 5 phm styrene level. The beneficial effect is greater in inventive Run 5 where 30 phm styrene were employed during coagitation.

Remarkably superior performance under SBR 1503 conditions occurred in inventive Run 6 with only 5 phm of the reaction inert hydrocarbon diluent xylene.

From the comparative runs made, as summarized above, it is evident that our invention of the employment of monomer or diluent during coagitation of the combination of emulsifier and modifier strongly reduces or eliminates the otherwise experienced abnormal depletion of modifier that otherwise occurs during the first stages of polymerization. Our invention makes it possible to utilize the advantages of coagitation yet without suffering inefficient and partially premature depletion of the modifier.

Polymers made in accordance with our invention can be compounded with stabilizers, antioxidants, fillers, pigments, reinforcing agents and such other additives as may be required. These polymeric products can be employed in the fabrication of tires, belts, gaskets, shoe soles, tubing and the like.

Embodiments of the invention in which an exclusive property or privilege is claimed are defined by the claims herein attached.

We claim:

1. In a process of aqueous emulsion polymerization wherein at least one polymerizable monomer polymerizable with a free-radical initiator is polymerized in the presence of a free-radical initiator, aqueous emulsifier solution, organosulfur compound as molecular weight modifier, in aqueous medium, the steps which comprise:

admixing said aqueous emulsifier solution, said organosulfur compound, and an additive which is a polymerization-inert hydrocarbon diluent, coagitating the admixture of aqueous emulsifier, organosulfur compound, and additive, prior to admixture with said initiator, to form a coagitated admixture wherein the degree of coagitation employed is sufficient to markedly increase the reactivity of said organosulfur compound as said molecular weight modifier in said aqueous emulsion polymerization, wherein the amount of said additive employed is an effective amount sufficient to substantially avoid early depletion of said organosulfur compound molecular weight modifier during said aqueous emulsion polymerization and is in the range of about 0.1 to 50 phm, and thereafter admixing said coagitated admixture with said polymerizable monomer, said initiator, and aqueous medium, to form an emulsion polymerization system, and polymerizing said monomer under aqueous emulsion polymerization conditions.

2. The process according to claim 1 wherein said polymerizable monomer is a polymerizable conjugated diene, monovinyl-substituted aromatic compound, monopropenyl-substituted aromatic compound, polymerizable vinylnitrile ester of acrylic or methacrylic acid, vinyl ester, or vinyl halide; and said hydrocarbon diluent is an aliphatic, cycloaliphatic, or aromatic hydrocarbon.

3. The process according to claim 2 herein said additive is employed in a range of about 1 to 10 phm.

4. The process according to claim 3 wherein said free-radical initiator is a redox couple, peroxide, hydroperoxide, or azo compound;

and wherein said coagitation sufficient to markedly increase the reactivity of said organosulfur compound as said molecular weight modifier is characterized as being sufficient to afford significant increase in the regulating index of said organosulfur compound.

5. The process according to claim 4 wherein said organosulfur molecular weight modifier is selected from the group consisting of mercaptans, dialkyldixanthogens, diaryl disulfides, tetra-alkylthiuram mono- or disulfides, mercaptothiazoles, or mixtures, and wherein said emulsifier in said aqueous emulsifier solution is selected from the group consisting of rosin acid soaps, disproportionated rosin soaps, fatty acid soaps, alkarylsufonate, nonionic emulsifiers, or mixtures.

6. The process according to claim 5 wherein said organosulfur molecular weight modifier is a hydrocarbyl mercaptan of 8 to 20 carbon atoms per molecule.

7. The process according to claim 6 wherein said emulsion polymerization process employs about 0.01 to 5 parts of said organosulfur compound as said molecular weight modifier per 100 parts monomer by weight; sufficient emulsifier to provide about 0.5 to 10 phm; said free-radical initiator is employed in the range of about 0.01 to 5 phm;

and wherein said aqueous emulsion polymerization conditions include a polymerization at a temperature in the range of about $-40°$ C to $+100°$ C, and at a pH in the range of about 1 to 12.

8. The process according to claim 7 wherein said at least one polymerizable monomer employed in said aqueous emulsion polymerization system comprises butadiene and styrene, said modifier is t-hexadecylmercaptan, and said additive is xylene employed at about 5 phm.

9. The process according to claim 8 wherein said butadiene and styrene are employed as said polymerizable monomers in an SBR 1503 or SBR 1500 process.

10. In a process of aqueous emulsion polymerization wherein at least one polymerizable monomer is polymerized in the presence of components comprising a free-radical initiator, aqueous emulsifier solution, organosulfur compound as molecular weight modifier, in aqueous medium, the steps which comprise.

admixing components consisting essentially of said aqueous emulsifier solution, said organosulfur compound, and an additive which is a polymerization-inert hydrocarbon diluent, coagitating the admixture of aqueous emulsifier, organosulfur compound and additive, prior to admixture with said initiator, to form a coagitated mixture, wherein the degree of coagitation employed is sufficient to markedly increase the reactivity of said organosulfur compound as said molecular weight modifier, wherein the amount of said additive employed is an effective amount sufficient to substantially avoid depletion of said organosulfur compound molecular weight modifier during said aqueous emulsion polymerization and is in the range of about 0.1 to 50 phm, and thereafter admixing said coagitated admixture with said polymerizable monomer, said initiator, and aqueous medium, and polymerizing said polymerizable monomer under aqueous emulsion polymerization conditions;

wherein said polymerizable monomer is a polymerizable conjugated diene, monovinyl-substituted aromatic compound, monopropenyl-substituted aromatic compound, polymerizable vinylnitrile ester of acrylic or methacrylic acid, vinyl ester, or vinyl halide; and said inert hydrocarbon diluent is an aliphatic, cycloaliphatic, or aromatic hydrocarbon, said organosulfur compound is a mercaptan, dialkyldixanthogen, diaryl disulfide, tetraalkylthiuram mono or disulfide, mercaptothiazole, or mixture, and said emulsifier in said emulsifier solution is a rosin acid soap, disproportionated rosin soap, fatty acid soap, alkarylsulfonated, nonionic emulsifier, or mixture.

11. The process according to claim 10 including the step of adding said inert hydrocarbon diluent additive to said emulsifier-modifier admixture subsequent to coagitation thereof, and the resulting admixture thereafter is subjected to additional coagitation.

12. The process according to claim 10 wherein said free-radical initiator is a redox couple, peroxide, hydroperoxide, or azo compound;

and wherein the degree of said coagitation is sufficient to markedly increase the reactivity of said organosulfur compound as said molecular weight modifier and is characterized as being sufficient to afford significant reduction in the particle size of said organosulfur compound in admixture with said aqueous emulsifier solution.

* * * * *